United States Patent [19]

Liu

[11] Patent Number: 5,040,084
[45] Date of Patent: Aug. 13, 1991

[54] DISK DRIVE SYSTEM AND METHOD
[75] Inventor: Hsinlai C. Liu, Los Angeles, Calif.
[73] Assignee: Digisys Corporation, Fullerton, Calif.
[21] Appl. No.: 334,294
[22] Filed: Apr. 6, 1989
[51] Int. Cl.[5] .............................................. G11B 5/596
[52] U.S. Cl. ............................ 360/77.04; 360/77.07; 360/78.13; 318/696
[58] Field of Search ............. 360/71, 75, 77.02–77.11, 360/78.13, 78.04, 78.08; 318/685, 696

[56] References Cited

U.S. PATENT DOCUMENTS 4,241,434  12/1980  Shida et al. ........................ 318/696
4,530,020   7/1985  Sutton ............................. 360/77.04
4,675,756   6/1987  Saitoh et al. ........................ 360/71

OTHER PUBLICATIONS

IBM TDB, vol. 19, No. 6, "Self Calibrating Disk Storage Apparatus", Griffiths et al., 11/76, pp. 1991–1992.

Primary Examiner—Vincent P. Canney
Assistant Examiner—Steven R. Garland
Attorney, Agent, or Firm—Walter A. Hackler

[57] ABSTRACT

Method and apparatus is provided for writing and reading data from a rotatable disk. Utilizing the apparatus of the present invention, the method includes the steps of formatting the disk with a plurality of spaced apart generally circular servo tracks with data tracks disposed therebetween. A servo signal is recorded on the servo tracks and one embodiment of the invention the position of adjacent data tracks is determined from the position of the servo track on an open loop basis. No embedded servo tracks are utilized in the present invention, nor is there a need for closed loop servo system. The apparatus includes a stepper motor for causing movement of an electromagnetic head relative to the rotatable disk and circuit means for generating three phased voltage pulses for driving the stepper motor with a second of the three phased voltage pulses being of an opposite phase than a first and third of said three pulses.

19 Claims, 3 Drawing Sheets

DISK DRIVE SYSTEM AND METHOD

The present invention is generally related to apparatus and methods for storing data on disks. More particularly, the present invention has particular advantage as it relates to high density data storage on removable disks, both floppy and hard.

In general, a floppy disk memory system includes a floppy disk and a floppy disk drive. A floppy disk is a flexible member coated with a magnetic recording medium and permanently housed in a jacket provided with holes for providing access to the recording medium.

A drive suitable for use with the floppy disk generally includes a motor driven spindle, one or more electromagnetic head members and associated electronics mounted in a housing. The disk is sized for removable insertion into the disk drive housing where it is engaged by a spindle which rotates the disk within its jacket. An electromagnetic read/write head, or transducer, is typically positioned relative to the floppy disk by an open loop stepper motor which has predetermined increment of motion. The read/write head is operative for recording data on a series of concentric tracks on the magnetic disk.

Presently, the most common types of floppy disks, such as the 3-½ inch diameter, can store up to 1.44 M bytes in 80 cylinders on the disk with a track density of 135 TPI (tracks per inch). A commonly available 5-¼ inch drive has a capacity of up to 1.2 M bytes on 80 cylinders utilizing 96 TPI.

Many types of memory devices have been devised in order to achieve compact storing of data. For example, a hard, or a Winchester disk memory, is similar to a floppy disk memory in that it records and reproduces data signals on and from a rotating magnetic disk member. To increase the memory thereof, the Winchester disk memory typically comprises a plurality of stacked rigid magnetically coated disk members which are permanently housed in the disk drive. However, this type of memory system, as well as memory systems having compatible memory storage of hundreds of megabytes, are quite expensive when compared to available floppy disk memory systems.

More data can be stored on a conventional floppy disk if the number of bits per inch of data is increased, or the number of tracks per inch increased. It must be appreciated, however, that if more tracks per inch are utilized, much more accurate head placement must be provided in order to properly align the head to a track. If improperly aligned, the head will read signals from an adjacent track, or possibly from a previously written track, which appears as noise to the desired signal. It is obvious that if the noise to signal ratio is large, the desired signal will be considered in error.

It should also be obvious that if the data on a track is read immediately after a track is written, there is no problem maintaining accurate head placement over the track. However, a number of factors affect precise track acquisition and placement of a head thereover. The errors and the factors may be enumerated as follows:

Once Around Runout

After a disk is removed and replaced, the center of disk rotation may change. This can cause track eccentricities of up to one mil.

Constant Runout

The disk drive along with the stepper motor and associated computer equipment and accessories create a considerable amount of heat. Therefore, as the floppy disk remains in the drive unit, its temperature changes, causing the disk to either expand or contract. The change in the radius of the track cylinder due to this expansion or shrinkage may be in the order of up to 2 mil.

Twice Around Runout

Because of the material of construction, for example, thin Mylar ®, or a polyester that is coated with a magnetic material and a low cost process for making the disks, it does not uniformly expand or contract. That is, the thermal expansion of the disk is greater along one radius than along a perpendicular radius, which results in non-isotropic expansion of the disk. This effect can change the location of the track on the disk in the order of up to one mil.

Unit To Unit Compatibility

Due to the fact that disk drives manufactured are not identical, the mechanical alignment of heads at track steps cannot be totally precise. That is, disks written in one drive and read in another drive may encounter off track positioning errors due to unit to unit variation, which may be in the order of one mil.

As hereinbefore set forth, a track density of 135 TPI is a current industry standard. This track density results in a track width of 135 or 0.0074 inches (7.4 mil). Hence, the hereinabove enumerated factors resulting in track errors of 1-2 mils can be accommodated without correction therefor. However, if track density is increased to 400, for example, the track width is 1/400 or 0.0025 inches (2.5 mil) and track errors of 1-2 mils must be taken into account in order to achieve consistent retrievable data storage.

Attempts to increase the track density have been implemented by track sensing techniques, which enable active seeking of the track. However, this requires embedding or inscribing track position in some way onto the disk and a servo system for seeking this information and, in a closed loop manner, adjusting the head position to accommodate for track movement.

Unfortunately, this is expensive, since track following systems require continuous positioning which typically requires a voice coil actuator and elaborate mechanisms which increase the cost of such floppy drives to at least the price the least expensive Winchester type disk drive. Hence, cost considerations have promoted the use of basic Winchester drive units over that of sophisticated track following floppy disk drive systems.

Hence, there is a need for a disk drive system and method which can utilize standard media such as, for example, 3-½ inch and 5-¼ inch floppy disks, without preformatting thereof or embedding track positions thereon while providing greater storage of data. Further, it is preferable that a system be developed which utilizes standard mechanisms with a few modifications for both economical considerations and for compatibility with existing units.

The present invention provides apparatus and a method for writing and reading data from a rotatable disk utilizing increased track density than heretofore possible without the use of track following systems. As an example, the apparatus and method of the present invention enables the storage of up to 8 megabytes of unformatted data on a standard generic 3-½ inch high density oxide coated floppy disk.

SUMMARY OF THE INVENTION

A method for writing and reading data from a rotatable disk in accordance with the present invention generally includes the steps of formatting the disk with a plurality of spaced apart generally circular servo tracks with data tracks disposed therebetween and thereafter recording a servo signal on the servo tracks.

The position of each servo track may be determined using the servo signal on each track and thereafter the determined position of a selected servo track is used to locate an adjacent data track. When the data track is located, writing and reading of data is thereafter performed. More particularly, the disk is formatted with the servo tracks being centered in zones with adjacent data tracks on each side of the servo tracks and the location of adjacent data tracks within the selected zone is found by the determined position of the servo track within the selected zone.

More particularly, in accordance with the present invention, the step of determining the position of each servo track includes a step of straddling an electromagnetic head between adjacent tracks of a servo track and, as the disk is rotated, using the recorded signals to measure the position of the servo track and recording the position of the servo track in a separate memory as a servo track profile.

Importantly, according to one embodiment of the present invention, location of the data track within the zone is found by assuming all the data tracks within a selected zone to have a data track profile identical to the servo track profile within the zone. The method, in accordance with the present invention, therefore accommodates for all of the hereinabove identified track position errors, because within a zone, once around runout errors due to a change in the center of the disk rotation are minimal. In addition, constant runout and twice around runout errors due to temperature and humidity changes, while altering servo profiles throughout the entire disk, do not change significantly within identified zones on the formatted disk. Because the zone is of a small size compared to the total number of tracks on the disk, unit to unit compatibility type errors are also virtually eliminated.

In order to establish the position of the servo tracks, the disk is formatted with a servo track consisting of two adjacent tracks with a signal recorded on each adjacent track, such that when one adjacent track has zero amplitude signal, the other adjacent track has a signal with an amplitude greater than zero. Thereafter, the step of determining the position of each servo track includes the step of predicting the position of the servo track based on the recorded profile, measuring the difference between the predicted servo track position and the actual position of the servo track and correcting the recorded profile with the measured difference. It cannot be over-emphasized that the method of the present invention is a non-following method of determining tracks on the disk. There is no servo track feedback data nor closed loop system required in order to carry out the method of the present invention, rather once a first profile, which may include the recording of 24 pairs of data point relative to an index point on the disk for each servo track is made, the servo track profile, being an accumulation of all the servo track positions set down in a circular pattern around the disk, may be predicted. To clarify this point, it should be pointed out that once initially measured, the profile of the servo track will change due to the factors hereinabove elucidated. An important concept of the present invention is the assumption that all of the data tracks within a zone will change to the same degree that the servo track does. Hence, it is not necessary to determine the position of every data track on the disk, but only the profile of the servo track disposed within the zone.

Consequently, in accordance with the present invention, the method enables the reading and writing of the data from a floppy disk having up to about 700 tracks per inch formatted therein. On the other hand, if a removable hard disk is formatted in accordance with the present invention, about 1400 tracks per inch of servo and data tracks may be employed. In the instance of a floppy disk, the disk may be formatted with up to 22 servo tracks with about 32 data tracks per zone and with a removable hard disk, up to about 44 servo tracks may be formatted with about 32 data tracks per zone.

While any number of methods may be employed to determine the position of the servo tracks in accordance with the present invention, the recorded signal on adjacent tracks of a servo track may each alternate between a constant non-zero amplitude and zero amplitude and the step of determining the position of each servo track may include the step of sensing the amplitude of the recording signal, producing a pair of integrated comparison signals, one associated with each adjacent track and thereafter comparing the comparison signals.

In an alternative embodiment of the invention, a method for writing and reading data from a rotatable disk may comprise the steps of formatting the disk with a plurality of spaced apart generally circular servo track with data tracks disposed therebetween and recording servo signal on the servo tracks. In this embodiment, the method includes the step of determining the position of each servo track using the servo signal on each track and thereafter using the determined position of two servo tracks to locate data tracks disposed between the said servo tracks and thereafter writing and reading data from the located track.

More particularly, the step of using the determined position of the two servo tracks to locate a data track includes interpolation of the determined position of the two servo tracks. The determined position of each servo track is related to the track profile hereinabove identified which is an accumulation of the data points recorded relative to index on the disk which identifies the servo track position on the disk.

While in the first embodiment of the present invention, the method included the assumption that the data tracks profile were identical to the servo profile within a zone, the second embodiment identifies two separate profiles which may be disposed on an innermost circular track and an outermost circular track of the disk and assumes that the data tracks lying therebetween will change in profile between the two servo tracks in a linear manner or in some other identified function, thereby enabling the interpolation of the data track profile from the two servo tracks bordering the data tracks.

Importantly, it must be recognized that the determination of data tracks in accordance with either embodiment of the present invention is not found by following the data tracks or using a closed loop servo system for determining the position or profile of the data tracks or the position and profile of the servo tracks, but rather the position of the servo tracks and the data tracks as predicted in a manner similar to dead reckoning from a recursive measurement of the servo track position.

An important aspect of the present invention, in view of the large number of tracks per inch utilized in accordance with the method of the present invention, is the method of moving the electromagnetic head for both the determination of a servo profile and the locating of a data track.

In accordance with the present invention, a method for writing and reading data from a rotating disk using an electromagnetic head driver by a stepper motor through a lead screw includes generating at least one phased voltage pulse for driving the stepper motor in order to move the electromagnetic head relative to the rotating disk. More particularly, the step of generating at least one phased electrical voltage pulse includes generating three pulses for causing each movement of the stepper motor with the second of the three pulses being of an opposite phase than the first and the third of the three pulses.

Heretofore utilized driver circuits for stepper motors have utilized control systems which provide a constant signal to the stepper motor which is correlated to the final desired position of the stepper motor which correspond to a preselected position of the electromagnetic head. In other words, a signal is generated which corresponds to the number of steps forward or backward stepper motor was required to make in order to position the head at a preselected position.

In view of the fact that the method of the present invention utilizes a great number of tracks, the prior art positioning of the read/write head hereinabove described is not adequate to accurately position or move the read/write head with sufficient accuracy in order to command the advantages offered by the method of the present invention.

The hereinabove described method of moving a read/write head with a stepper motor, in accordance with the present invention, may be described herein as a "knock" method of driving a stepper motor. Utilizing a pulse method, particularly a 3 pulse method hereinabove described hysteresis, always present in mechanical lead screw type devices is virtually eliminated, thus enabling, in accordance with the method of the present invention, the reading and writing data up to 1400 tracks per inch.

The apparatus, in accordance with the present invention for writing and reading data from a magnetic recording disk includes means for rotating the disk, electromagnetic head means for writing and reading data to and from the electromagnetic recording disk and means for causing the electromagnetic head means to format the disk with a plurality of spaced apart generally circular servo tracks with data tracks disposed therebetween. In this formatting, the servo tracks have servo signal recorded therein with one servo track and adjacent data tracks comprising a zone.

First electrical circuit means is provided which is interconnected with the electromagnetic head means for determining the position of each servo track using the servo data on each track. Second electrical circuit means is provided which is interconnected with the electromagnetic head means for locating a data track within a zone containing the selected servo track and third circuit means, interconnected with the electromagnetic head means is provided for writing and reading data from the located data track.

In an alternative embodiment of the present invention, means may be provided for causing the electromagnetic head means to format the disk with a plurality of spaced apart generally circular servo tracks with data tracks disposed therebetween with the second electrical circuit means interconnected with the electromagnetic head means for locating a data track disposed between the servo tracks.

More particularly, means are provided for removably supporting the magnetic recording disk in an operable position with the electromagnetic head means and stepper motor means are provided, interconnected with the electromagnetic head means by a lead screw, for moving the electromagnetic means relative to the disk.

The stepper motor means may comprise a two phase stepper motor responsive to electrical pulses for causing stepwise movement of the electromagnetic head means and circuit means may to be provided for generating at least one phased voltage pulse for driving the stepper motor. Specifically, the circuit means for generating one phased voltage pulse may include means for generating three phased voltage pulses with a second of the three pulses being of an opposite phase than a first and a third of the three pulses.

BRIEF DESCRIPTION OF THE DRAWINGS

A better understanding of the present invention may be had from the consideration of the following detailed description taken in conjunction with the accompanying grawings in which.

DETAILED DESCRIPTION

Figure 1:
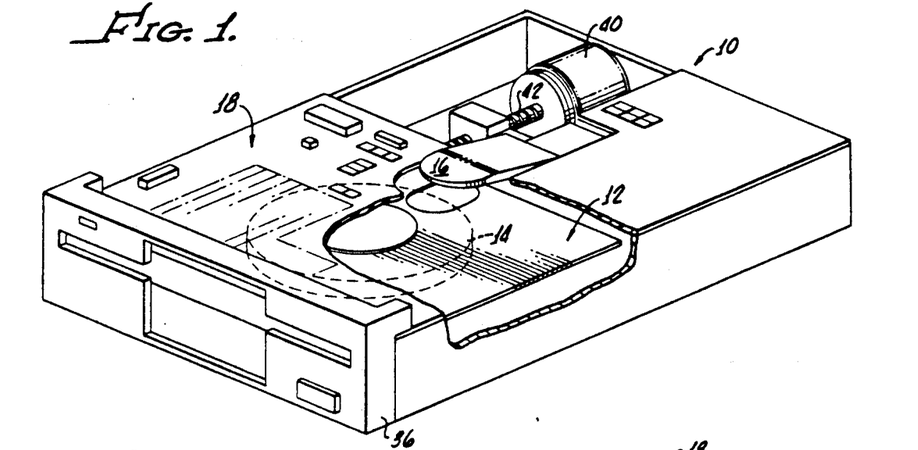
FIG. 1 is a perspective view of apparatus in accordance with the present invention generally showing a motor for rotating a disk, an electromagnetic head for writing and reading data to and from the magnetic recording disk, a stepper motor interconnected with the electromagnetic head by a lead screw and electronic circuits for performing the method of the present invention.
Figure 2:
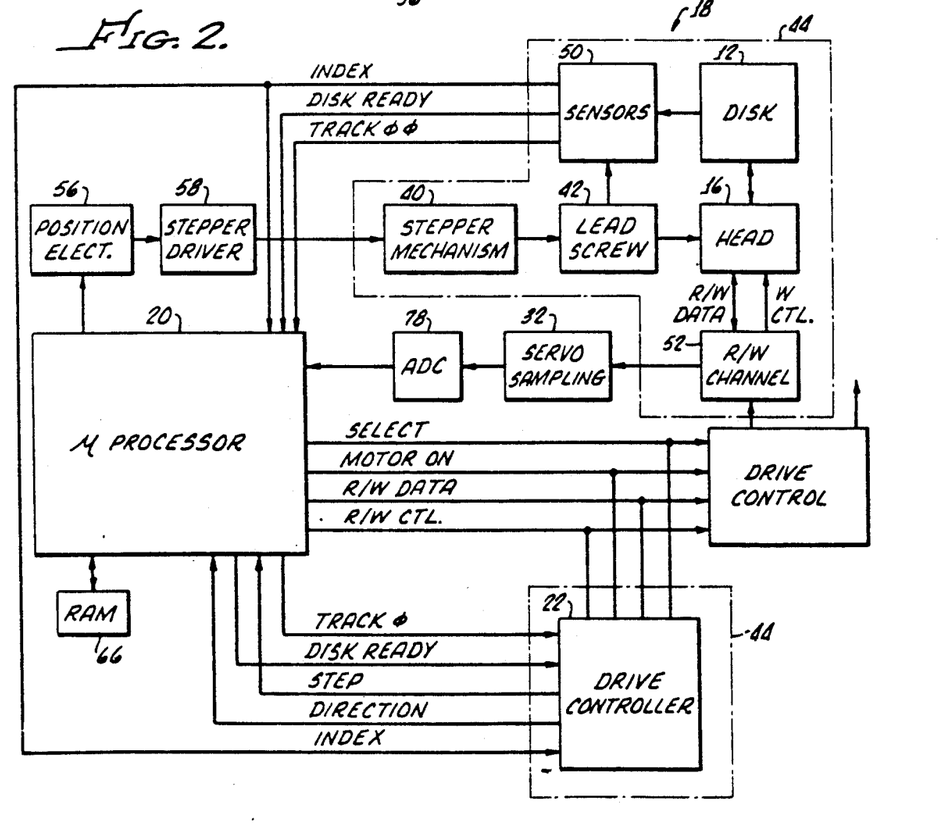
FIG. 2 is a general block diagram of apparatus in accordance with the present invention.

Turning now to FIG. 1 there is shown apparatus 10 for writing and reading data from a magnetic recording disk 12 which may be any commercially available 3-½ or 5-¼ inch disk. A motor 14 provides means for rotating the disk 12 in a conventional manner and an electromagnetic read/write head 16 provides means for writing and reading data to and from the disk 12. Electronic circuitry 18, which may include a micro processor 20, in accordance with the present invention, in combination with a conventional drive controller 22, see FIG. 2, is provided for causing the head 16 to format the disk 12 with a plurality of spaced apart generally circular servo tracks 26 with data tracks 28 disposed therebetween, see FIG. 3. A first electrical circuit interconnected with the head 16 provides means for determining the position of each servo track 26 using servo data formatted on each track with the microprocessor 20 providing a second electrical circuit, interconnected with the electromagnetic head, for locating a data track 28 disposed between servo tracks 26, a third electrical circuit provides means for writing and reading data from the located data track.

Turning again to FIG. 1 a housing 36 provides means for removably supporting the disk 12 in an operable position with the head 16 in a conventional manner. A conventional stepper motor 40, interconnected in a conventional manner with the electromagnetic head 16 by a lead screw 42, provides means for moving the electromagnetic head 16 relative to the disk 12.

Turning to FIG. 2, which is a block diagram of the apparatus in accordance with the present invention, compatibility with existing drive control apparatus 44 is evidenced by the fact that mechanical portions as well as the drive controller 22 may be conventional off-the-shelf items. In that regard, the sensors 50 may include an LED switch (not shown) for finding the zero track on a disk, a limit switch (not shown) to determine when a disk is inserted into the housing 36 and a magnetic switch (not shown) used to determine the index point on each disk are conventional and well known in the art.

As previously set forth, all of these items are conventional in nature, along with electronics provided in a read/write (R/W) channel 52, which provides circuitry to handle the reading and writing disk signals, along with the drive controller, which manages the operation of the disk through the driving of the motor, the writing of information on the disk and the determination of zero track position on the disk. Other components, for example, the position electronics 56 and the stepper driver 58, may be the same as used in conventional Winchester drives.

It should be appreciated that the present description is directed to a floppy disk drive for illustrative purposes only and that the apparatus and method of the present invention also encompass hard disk drives.

All of the electronics illustrated in block form herein may be described in a conventional functional manner, as there may be an infinite variety of specific electronic circuits and/or combinations of operational chips with a variety of microprocessor instructions which would accomplish what is functionally described herein. It is to be considered that all of these variations of instructions, electronic circuit chips and control programs therefor, should be considered equivalent to the apparatus of the present invention if they perform the function as hereinafter described in accordance with the method of the present invention.

Figure 3:
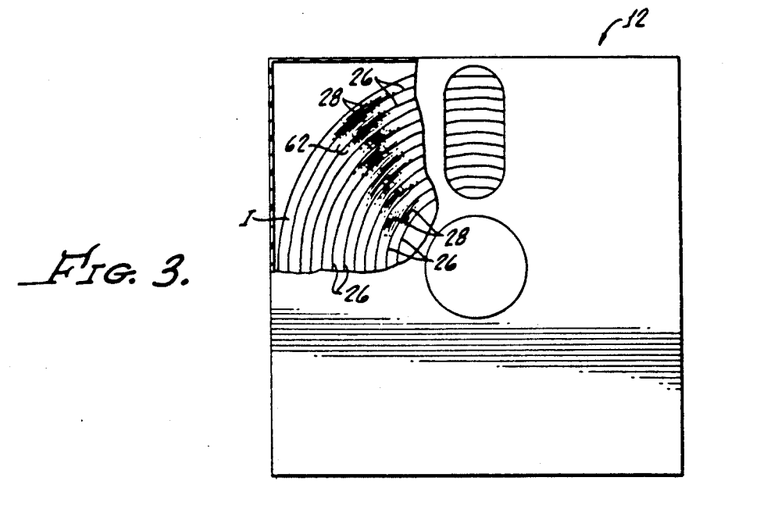
FIG. 3 is a plane view of one embodiment of the present invention showing a plurality of servo tracks formatted on a disk with data tracks therebetween, one servo track and adjacent data tracks on each side thereof comprising a zone.

In accordance with one embodiment of the present invention, the disk 12 is formatted as represented in FIG. 3, with a plurality of servo tracks 26 with data tracks 28 therebetween. By way of example only, for a 3-½ inch generic type high density floppy disk medium with a high density oxide coat thereon, the track density of both the data and the servo tracks may be 540 tracks per inch on both sides of the disk with a maximum linear density of about 17.4 K byts per inch.

While a plurality of servo data may be formatted on both sides of the disk in accordance with the present invention, it is only necessary to record one servo track, both on an opposite or reverse side of the disk in order to calibrate the opposite side to the side having a plurality of servo tracks. In this instance, the servo track zone is expanded to comprise the data track on both sides of the disk with the servo track being centered therein. The single servo track is used to calibrate or adjust for side to side variations in the disk.

When the disk is rotated at 300 RPM (conventional) the present invention affords the recording of 8 M byts unformatted, which means a data capacity of 12.5 K byts per track. This specific configuration is offered by way of example only and is not meant to be limiting to the number of tracks per inch that may be utilized in accordance with the method of the present invention. Utilizing a floppy disk, it is expected that the disk 12 may be formatted with up to about 700 or more tracks per inch of servo and data tracks.

As hereindescribed in greater detail, there may be 32 tracks for each zone 62 and if a floppy disk is formatted with up to 700 tracks per inch, there will be about 22 servo tracks on such formatted floppy disk.

On the other hand, a removable hard disk affords an even greater track density capability. It is expected that a rotating hard disk may be formatted with up to 1400 or more tacks per inch of servo and data tracks. In utilizing the same number of data tracks per zone, this results in about 44 servo tracks on a disk having about one inch recording capability. Obviously, larger and smaller disks may expose more surface or less surface for recording thereon and the total capacity of the disk would vary accordingly.

Figure 4:
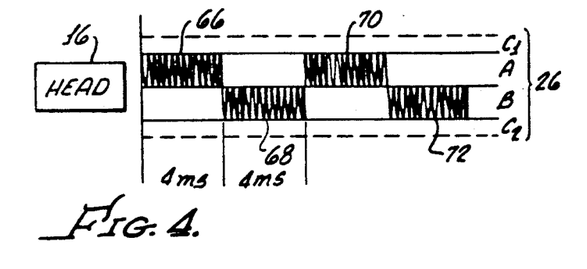
FIG. 4 is a representation of a servo track showing individual tracks with recorded signal thereon.

Diagrammatically, shown in FIG. 4 is a servo track 26 which occupies the physical space of two data tracks A, B. Half-tracks C1, C2, disposed on each side of the adjacent tracks A and B onto which no signal is recorded provide an isolation or boundary between the servo track 26 and adjacent data tracks 28 (not shown in FIG. 4).

Bursts of constant amplitude signal 66, 68, 70, 72 are recorded on the adjacent tracks A, B, such that when one adjacent track A has zero amplitude signal, the other adjacent track B has a signal with an amplitude greater than zero. It should be appreciated that when a track density of 400 tracks per inch is utilized, the total width of the adjacent A and B tracks is about 5 mils.

As a comparison to prior art devices, conventional floppy disk systems usually have no servo tracks, and by using the conventional 7 mil wide tracks (135 TPI) no correction track position errors are hereinbefore discussed track position errors are insignificant with respect thereto.

Determination of the position of each servo track 26 on the disk 12 includes the step of straddling the electromagnetic head 16 between the adjacent tracks A, B, of the servo track 26 as the disk 12 is rotated. The recorded signals 66, 68, 70, 72 to measure the position of the servo track 26 and record the position of the servo track 26 in a separate ram memory 66 as a servo track profile.

In this operation, the head 16 is moved to the formatted servo track 26 utilizing the hereinabove described mechanical apparatus, such as the stepper mechanism 40 and lead screw 42 via the drive controller 20 and microprocessor 18. When the disk is rotated with the head 16 disposed over the track 26, it is not moved relative thereto while measuring the relative amplitudes of the signals 66, 68, 70, 72. It can be easily appreciated that with the head remaining constant as the disk passes therebeneath, that variations in the tracks A, B, will cause the head to record quantitative amounts of the signal bursts 66, 68, 70, 72, in relation to whether it is positioned more in the track A or more in the track B.

The determination of the servo track position may be made at "power up" time and thereafter redetermined or reacquired periodically thereafter, or preferably, only when a read error occurs. When a read error is detected, only the servo track in the zone in which the read error occurs may be reacquired in order to reduce the time dedicated to servo track acquisition.

It has been found that the head may be activated for measuring the signal for only one millisecond, despite the fact that the length of the signal bursts 66, 68, 70, 72 may be 4 milliseconds. This is done to reduce any possible noise that be introduced if a longer window of reading were used which would cause overlap of the adjacent signals 66, 68 or 70, 72 to the head. The amplitude of signal measured from the bursts 66, 70 is compared to the bursts 68, 72, with adjacent bursts 66, 68 and 70, 72 being subtracted to determine the position of the tracks A and B with the head 16.

The disk is rotated at approximately 5 revolutions per second or 200 milliseconds per revolution. During this time, 24 pairs of A, B signals 66, 68 and 70, 72 are measured for each servo track from an index point I, (see FIG. 3) as determined by the conventional magnetic switch hereinabove described. To prevent the occurrence of oscillatory type measurement, if four equally opposite signals are read, the second and third are ascribed a zero value to avoid oscillation. That is, if the bursts 66, 68 result in a recorded signal reflecting a servo track position of plus three and the servo burst signal 70, 72, show a track position of minus 3 and subsequent pairs (not shown in FIG. 4) show a plus 3 and a minus 3 position of the track, continued oscillation of the determined position is eliminated by ascribing a value of 0 to the two second measured positions.

Alternatively, any type of filtering system may be used to damp possible oscillation due to successive measurement of the servo signal.

Figure 5:
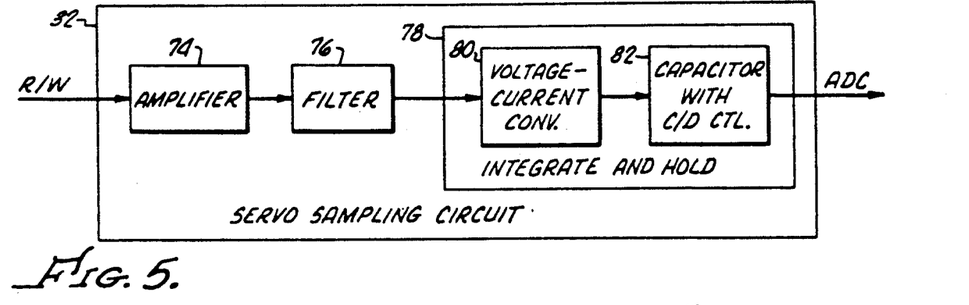
FIG. 5 is a detailed block diagram of the servo sampling circuit in accordance with the present invention.
Figure 6A:
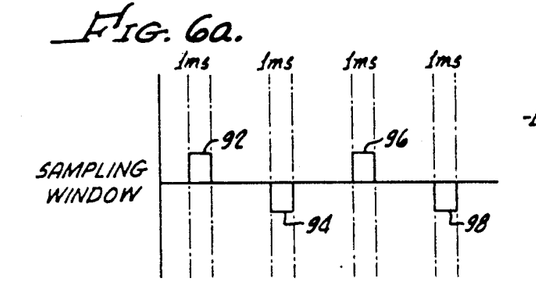
FIG. 6A is a representation of a sampling window for measuring servo signals.

As hereinbefore emphasized, during the servo track determination, the head does not follow the track but merely measures the relative amplitudes of the signal 62, 68, 70, 72, and therefrom determines where the actual center of the adjacent tracks A, B is relative to the index point 70 for each track. Utilizing the servo sampling circuitry 32, shown in FIG. 5, which generally includes an amplifier 74 filter 76 and an integration and hold circuit 78, which includes a voltage current converter 80 and a capacitor 82, the measured voltage pulses during a one millisecond window 92, 94, 96, 98, (FIG. 6A) takes on the waveform as shown in FIG. 6B as 102, 104, 106 and 108.

Figure 6B:
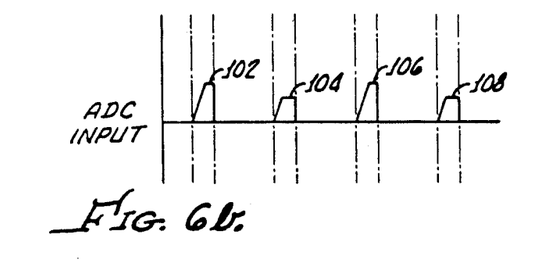
FIG. 6B is a representation of measured servo signals.
Figure 7:
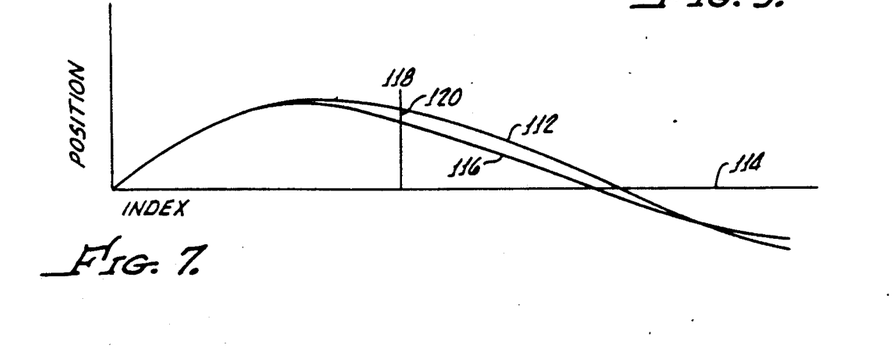
FIG. 7 is a plot of a track position with representation of a method of determining the servo track positions on the formatted disk.

As shown in FIG. 6B, the difference is between the signals 102, 104, 106, 108, directly related to position of the tracks A, B, with respect to the head 16. When the 24 pairs of data point relative to an index point on each disk for each servo track is determined, a servo track profile is calculated by the microprocessor and stored in the ram memory. This profile may be represented by a curve 112, as shown in FIG. 7, which shows the relative position of the servo track relative to the head position 114, with the profile 112 representing the measured position of the servo track 26 for a first measurement during one revolution of the disk. Thereafter, for example, on a second revolution, the position of the servo track is predicted on the basis of its recorded position and a second profile 116 is calculated. At each interval 118, the difference 120 between the projected servo track position 112 and the true servo track position is utilized to correct the recorded profile 112. This process may be continued in a successive approximation. This method of correcting the recorded profile may include the step of adding the recorded profile with the difference with a shifted phase angle and using digital filtering to damp possible oscillation due to successive approximation of the actual servo track positions.

It should be appreciated that any number of iterative measurements may so be made and different signals may be utilized to correct the predicted position of the servo track. What is important is that in this respect there is no system for causing the head to follow the servo track, but rather the head can remain in a fixed concentric position, measure the original position of the servo track, correct this position on subsequent revolutions, with the differences being caused by all of the factors hereinabove enumerated and thereafter predicting the position of the servo head without ever following it.

Once the position is found for all of the servo tracks 26, the method of the present invention assumes that all adjacent data tracks 28 (16 on each side) will have identical profiles, although spaced at a preselected position therefrom. Therefore, the head can be moved by the stepper motor to any selected data track within a zone containing a selected servo track and the head can predict the position of each data track with sufficient accuracy to enable correct repeatable reading and writing from data tracks with 400 tracks per inch.

Additional space on a conventional floppy disk may also be added by delaying the signal from the LED switch to the drive controller causing the head to position itself past the normally utilized recording area on the disk 12. In this manner, additional tracks may be recorded thus expanding the total storage capacity of the disk.

Figure 8:
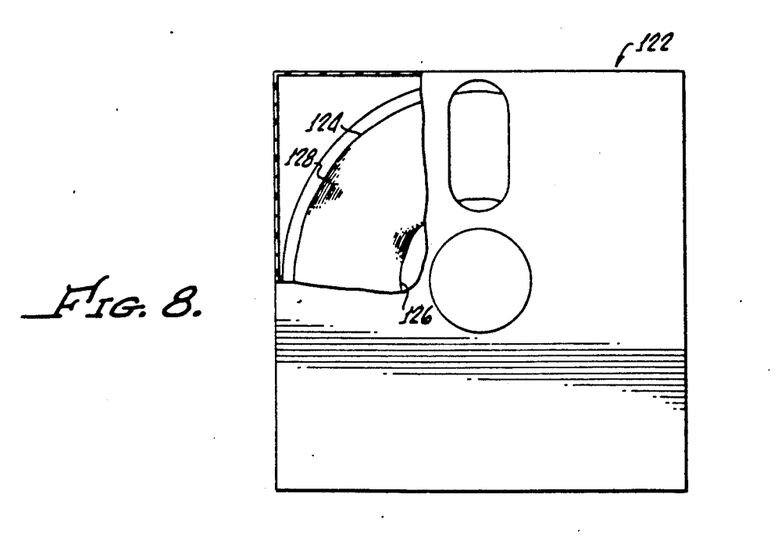
FIG. 8 is a plane view of a formatted disk in accordance with another embodiment of the present invention, showing an inner and an outer servo track with data tracks disposed therebetween.

In accordance with an alternative embodiment of the present invention, a disk 122 may be formatted with an outer servo track 124 and an inner servo track 126 with data tracks 128 disposed therebetween, as represented in FIG. 8. Using the determined position of the two servo tracks, 122/126, the data tracks 128 disposed therebetween are found and reading and writing data from the located data track may then proceed.

The servo tracks 124, 126 are formatted in a manner as hereinabove described with servo tracks 126. In this embodiment, however, the data tracks are not assumed to have a profile identical to either of the servo tracks 124, 126, but rather it is assumed that the data tracks disposed between the servo tracks 124, 126 vary in profile linearly or in accordance with a predetermined relationship, or function, so that the position thereof may be interpolated from the measured position of the servo tracks 124, 126.

As hereinbefore discussed, due to the fact that the apparatus and method of the present invention enables the formatting and use of tracks up to 700 TPI accurate positioning of the head 16 is of paramount importance. In that regard, as hereinabove briefly described, the stepper motor 40 is interconnected via the lead screw 42 with the head in a conventional manner.

However, the stepper motor 40 is caused to move with at least one phased electrical pulse 140 (See FIG. 9) in order to move the electromagnetic head relative to the rotating disk. More particularly, the microprocessor 20 is operational for providing to the position electronic circuit 56 and stepper driver 58 signals for generating at least 3 pulses for causing movement of the stepper motor with a second of the three pulses being of an opposite phase than a first and a third of the three pulses. This is to be compared with prior art conventional stepper motor drivers which provide a constant signal to the stepper motor corresponding to the ultimate position desired.

Figure 9:
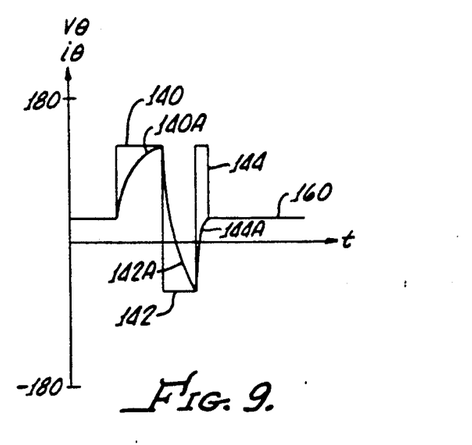
FIG. 9 is a plot of voltage and current pulses utilized in the present invention for driving the stepper motor.
Figure 10:
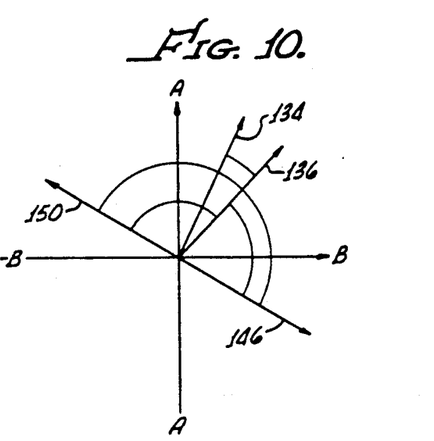
FIG. 10 is a diagram of electric pulses utilized to drive the stepper motor.

A representation of phased current pulses in accordance with the apparatus and method of the present invention is shown in FIG. 10. The diagram of FIG. 10 shows an original rotational position 134 of the stepper motor 40 and a desired position 136 of the stepper motor 40. Motor voltage pulses 140, 142, 144 and corresponding current pulses 140A, 142A, 144A, shown in a FIG. 9 are provided that cause movement of the stepper motor 40 toward an intermediate position 146, see FIG. 10. Before reaching that intermediate position, the second voltage pulse 142 having a minus 180 degrees phase moves the stepper motor 40 toward a position 150 and the final voltage pulse 144 results in movement of the stepper motor shaft to the position 136.

It should be appreciated that, as represented in FIG. 10, the current pulses drive the stepper motor toward intermediate position 146, 150 which are 90 degrees from the starting stepper motor position 134, these intermediate positions may be spaced at 15 degrees from the stepper motor starting position by using appropriate current pulses, the latter procedure resulting in greater operation of the stepper motor.

In this manner, rather than a continuous force being exerted on the stepper motor to move it from a first position 134 to a second position 136, the method of the present invention "knocks" the stepper motor with a series of hereinabove described pulses to its final position. Because of this procedure, there is very little hysteresis of the head and it is accurately positioned over the track as it is required by the apparatus and method of the present invention.

As is well known, all drives incorporating a lead screw are subject to dead spots, or backlash due to gear engagement tolerances inherent to the mechanical linkage. Because the stepper motor is always driven by a series of pulses, the slack or backlash is accommodated. That is, upon reversal of direction, a rotation of the stepper motor and direction of movement of the head, the slack is corrected for by walking a preset distance at &he moment of direction change.

This accurate positioning of the head and the formatting of up to the 700 tracks per inch results in unexpected reduction in noise pickup. As has been experienced in prior art devices azimuth angle type errors, as well known in the art due to the angular placement of the head relative to the concentric tracks, causes the pickup of data from adjacent bits on the track However, in the present invention, the head may be of a smaller size and noise pickup is significantly smaller because the track has smaller width. As a consequence, noise due to azimuth angle error is significantly reduced.

Although there has been described hereinabove a specific disk drive method and a system for the reading and writing of data from a rotating disk, in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. A method for writing and reading data from a rotatable disk comprising the steps of:
   formatting the disk with a plurality of spaced apart generally circular servo tracks with data tracks disposed therebetween;
   recording a servo signal on said servo tracks;
   determining the position of each servo track by measuring the servo signal on each track, recording the position of each servo track in a memory as servo track profile and thereafter predicting the position of a servo track based on the recorded profile, measuring the difference between the predicted servo track position and the servo track profile and correcting the recorded profile with the measured difference;
   using the determined position of a selected servo track to locate an adjacent data track; and
   writing and reading data from the located data track.

2. The method according to claim 1 wherein the disk is formated with servo tracks being disposed in zones with adjacent data tracks on each side of the servo tracks and the location of adjacent data tracks within a selected zone is found by the determined position of the servo track disposed within the selected zone.

3. The method according to claim 2 wherein said disk is a floppy disk and the step of formatting the disk includes formatting the disk with up to about 700 tracks per inch of servo and data tracks.

4. The method according to claim 3 wherein said disk is formatted with up to about 22 servo tracks and about 32 data tracks per zone.

5. The method according to claim 3 wherein said disk is formatted with up to about 44 servo tracks and about 32 data tracks per zone.

6. The method according to claim 1 wherein said disk is a hard disk and the step of formatting the disk includes formatting the disk with up to about 1400 tracks per inch of servo and data tracks.

7. A method for writing and reading data from a rotatable disk comprising the steps of:
   formatting the disk with a plurality of spaced apart generally circular servo tracks with data tracks disposed therebetween, said formatting including recording a servo track having two adjacent tracks with a signal recorded on each adjaent track such that when one adjacent track has zero amplitude signal, the other adjacent track has a signal with an amplitude greater than zero;
   recording servo data on said servo tracks;
   determining the position of each servo track by straddling an electromagnetic head between said adjacent tracks of a servo track and as the disk is rotated using the recorded signals to measure th eposition of the servo track, recording the position of the servo track in a separate memory as a servo track profile, and predicting the position of the servo track based on the recorded profile, measuring the difference between the predicted servo track position and the actual position of the servo track and correcting the recorded profile with the measured difference;

using the determined position of two servo tracks to locate a data track disposed between said two servo tracks; and writing and reading data from the located data track.

8. The method according to claim 7 wherein the step of correcting the recorded profile includes the step of adding the recorded profile with the difference with a shifted phase angle and using digital filtering to damp possible oscillations due to successive approximateion of the actual servo track position.

9. A method for writing and reading data from a rotating disk using an electromagnetic head driven by a stepper motor through a lead screw, said method comprising the steps of:

generating three pulses for causing movement of said stepper motor in order to move the electromagnetic head relative to said rotating disk, with a second of said three pulses being of an opposite phase than a first and a third of said three pulses;

moving the electromagnetic head with said stepper motor and supplying electric pulses to the electromagnetic head in order to format the disk with a plurality of spaced apart generally circular tracks with data tracks disposed therebetween, said servo tracks having servo data recorded thereon, one servo track and adjacent tracks comprising a zone;

determining the position of each servo track using the servo data on each track;

using the determined position of a selected servo track to locate a data track within a zone containing the selected servo track; and writing and reading data from the located data track using the electromagnetic head.

10. The method according to claim 9 wherein the step of formatting the disk includes recording a servo track having two adjacent tracks with a signal recorded on each adjacent track such that when one adjacent track has zero amplitude signal, the other adjacent track has a signal with an amplitude greater than zero.

11. The method according to claim 10 wherein the step of determining the position of each servo track includes the step of straddling an electromagnetic head between said adjacent tracks of a servo track and as the disk is rotated using the recorded signals to measure the position of the servo track and recording the position of the servo track in a separate memory as a servo track profile.

12. The method according to claim 11 wherein the step of determining the position of each servo track includes the step of predicting the position of the servo track based on the recorded profile, measuring the difference between the predicted servo track position and the measured position of the servo track and correcting the recorded profile with the measured difference.

13. The method according to claim 12 wherein the step of determining the position of each servo track includes the recording of 24 pairs of data points relative to an index point on said disk for each servo track, a pair of data points comprising measured amplitudes of said signals on adjacent tracks straddled by said electromagnetic head.

14. The method according to claim 13 wherein said recorded signal on adjacent tracks each alternate between constant non-zero amplitude and zero amplitude and said step of determining the position of each servo track includes the step of sensing the amplitude of the recorded signal, producing a pair of integrated comparison signals, one associated with each adjacent track and comparing the pair of signals.

15. The method according to claim 14 wherein said disk is a floppy disk and the step of formatting the disk includes formatting the disk with up to about 700 tracks per inch of servo and data tracks.

16. The method according to claim 15 wherein said disk is formatted with up to about 22 servo tracks and about 32 data tracks per zone.

17. The method according to claim 14 wherein said disk is a hard disk and the step of formatting the disk includes formatting the disk with up to about 1400 tracks per inch of servo and data tracks.

18. The method according to claim 14 wherein said disk is formatted with up to about 44 servo tracks and about 32 data tracks per zone.

19. Apparatus for writing and reading data from a magnetic recording disk comprising:

electromagnetic head means for writing and reading data to and from said disk;

housing means for removably supporting said magnetic recording disk in an operable position with said electromagnetic head means;

means for rotating the disk;

two phase stepper motor means, interconnected with said electromagnetic head means by a lead screw for causing stepwise movement of said electromagnetic head means relative to said disk;

circuit means for generating three phased voltage pulses for driving said stepper motor, with a second of said three pulses being of an opposite phase than a first and third of said three pulses;

means for causing the electromagnetic head means to format the disk with a plurality of spaced apart generally circular servo tracks with data tracks disposed therebetween;

first electrical circuit means, interconnected with said electromagnetic head means, for determining the position of each servo track using the servo data on each track;

second electrical circuit means, interconnected with said electromagnetic head means, for locating a data track disposed between said servo track; and third electrical circuit means, interconnected with said electromagnetic head means, for writing and reading data from the located data track.

* * * * *